United States Patent [19]
Gellert

[11] 4,446,360
[45] May 1, 1984

[54] SPRUE BUSHING CONNECTOR ASSEMBLY
[76] Inventor: Jobst U. Gellert, 7A Prince St., Glen Williams, Canada
[21] Appl. No.: 508,080
[22] Filed: Jun. 27, 1983

Related U.S. Application Data
[62] Division of Ser. No. 285,260, Jul. 20, 1981, Pat. No. 4,403,405.

[30] Foreign Application Priority Data
Jul. 15, 1981 [CA] Canada .................................. 381799

[51] Int. Cl.³ ............................................ F27B 14/06
[52] U.S. Cl. ..................... 219/421; 29/611; 219/541; 219/544; 219/424; 219/530; 228/136; 228/174
[58] Field of Search ............... 219/421, 424, 523, 541, 219/53 D, 544; 228/174, 136, 182, 254; 29/611, 613; 239/135; 425/548, 549, 568, 566; 222/146 HE

[56] References Cited
U.S. PATENT DOCUMENTS

| | | | |
|---|---|---|---|
| 3,934,333 | 1/1976 | Churchill | 29/611 |
| 4,043,740 | 8/1977 | Gellert | 425/566 |
| 4,164,646 | 8/1979 | Grise | 219/541 |
| 4,238,671 | 12/1980 | Gellert | 219/421 |
| 4,304,544 | 12/1981 | Crandell | 425/549 |
| 4,355,460 | 10/1982 | Gellert | 29/611 |

Primary Examiner—Volodymyr Y. Mayewsky
Attorney, Agent, or Firm—Riches, McKenzie & Herbert

[57] ABSTRACT

This invention relates to an improved connector assembly for an electrically heated injection molding sprue bushing and a method of making the same. The sprue bushing has a helical portion of the heating element extending around a central core portion which conveys pressurized melt from a molding machine to a cavity in the mold. It is formed by filling the space between the stainless steel core portion and a stainless steel outer sleeve by a highly conductive copper alloy. The heating element has a lead portion which extends out through an aperture. The aperture provides a seat which receives two split washers with central openings therethrough for the lead portion. The washers are each formed of two half washers which are oriented so that the divisions therebetween are not aligned. A connector sleeve is inserted over the projecting lead portion with a flared end which is received in the aperture against the washers. The washers and connector sleeve are brazed in position in a vacuum furnace. This provides an integral connector assembly with sufficient structural strength which is sealed at the aperture against the copper alloy. This prevents the transfer of excessive heat out to the area of the connection with the external lead wires.

4 Claims, 5 Drawing Figures

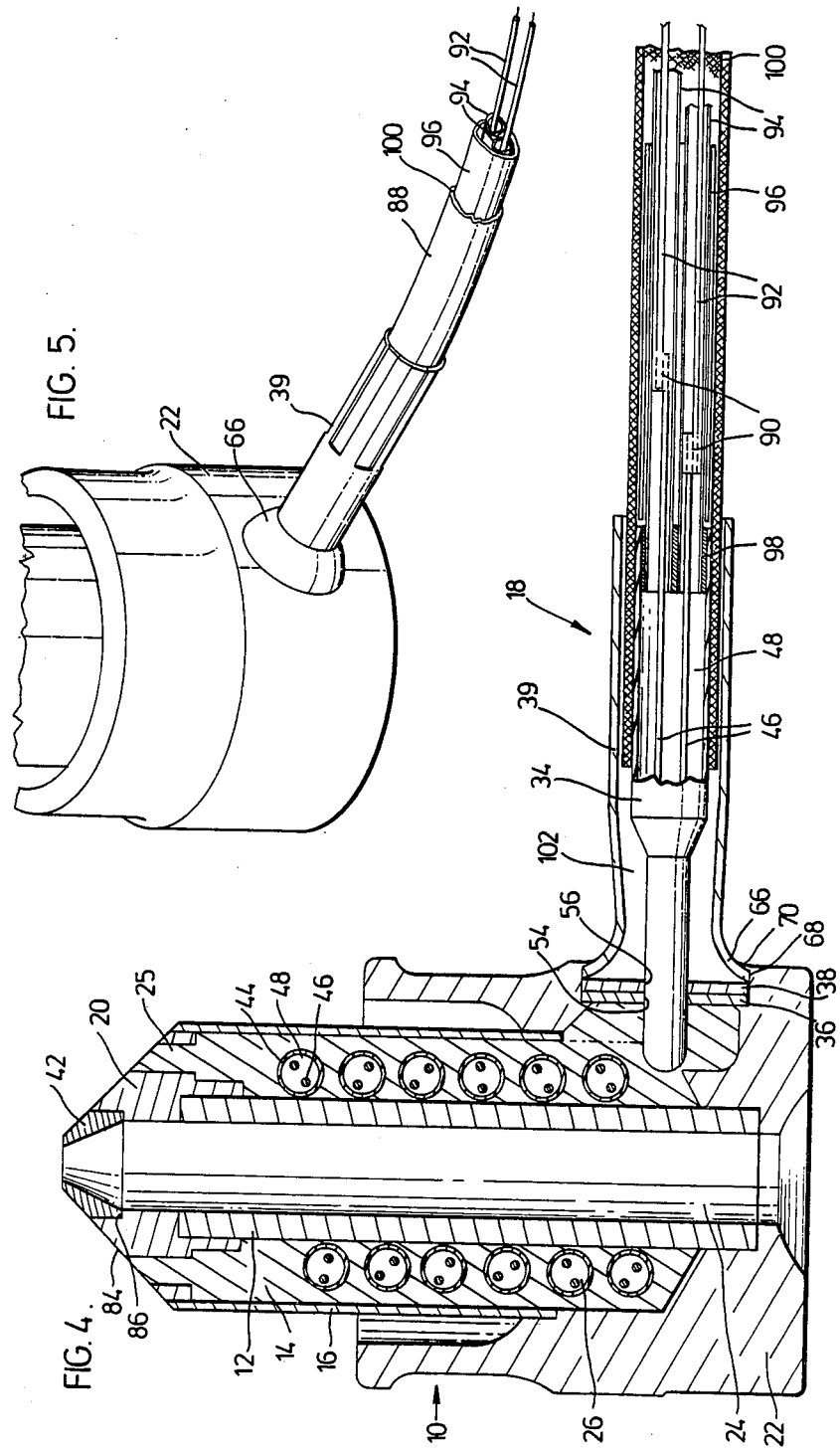

SPRUE BUSHING CONNECTOR ASSEMBLY

This is a divisional of application Ser. No. 285,260 filed July 20, 1981 now U.S. Pat. No. 4,403,405.

BACKGROUND OF THE INVENTION

This invention relates to an electrically heated sprue bushing for injection molding, and more particularly to an improved connector assembly therefor and method of making the same.

The applicant's U.S. Pat. No. 4,238,671 entitled "Sprue Bushing With Cast In Heater Element" which issued Dec. 9, 1980 shows a sprue bushing used to convey pressurized melt from a molding machine to the mold. The sprue bushing has an electrical heating element with a helical portion surrounding the runner passage and a lead portion which extends out through an aperture for connection to an external power source. While providing several advantages, this structure has been found to have the disadvantage that the lead portion of the heating element is very susceptible to failure at the point where it passes through the aperture due to its not having sufficient strength to withstand stresses or blows it may receive accidentally. Due to the integral structure of the sprue bushing, this normally cannot be repaired and necessitates the replacement of the whole unit.

More recently, the applicant's U.S. patent application Ser. No. 217,115 filed Dec. 17, 1980, now abandoned, entitled "Sprue Bushing and Method of Manufacture" describes an improved sprue bushing in which this problem is overcome by casting the lead portion of the heater element in copper alloy to be solidly integral with the rest of the unit. While this provides sufficient structural strength to avoid breakage, it has the disadvantage that the copper alloy conducts the heat further out with the result that the connections to the external lead wires are susceptible to over heating.

Therefore, it is desirable to provide a connector assembly structure which has a combination of sufficient structural strength and a facility for making a durable connections to the external lead wires, which may be conveniently manufactured by a method incorporating the previously developed special techniques for providing the rest of the sprue bushing.

SUMMARY OF THE INVENTION

Accordingly, it is an object of the present invention to at least partially overcome the disadvantages of the prior art by providing a sprue bushing with a connector assembly and method of manufacture whereby an integral protective connector sleeve extends outwardly around the lead portion of the heating element, but the aperture is substantially sealed to prevent the sleeve from filling with highly conductive material.

To this end, in one of its aspects, the invention provides an integral electrically heated sprue bushing having a hollow elongated inner core portion with a runner passage extending centrally therethrough, an electrical heating element with a helical portion encircling the inner core portion and a lead portion extending out through an aperture in the bushing which is considerably larger than the heating element lead portion, a highly conductive elongated portion around the helical portion of the heating element, and an elongated outer sleeve portion over the conductive portion, with the improvement further comprising the aperture having seat means therein, first split washer means with a central opening through which the heating element lead portion extends formed by fitting a first plurality of split washer portions in the seat means in the aperture around the heating element lead portion thereby substantially closing the space therearound, second split washer means similar to the first split washer means formed adjacent thereto by fitting a second plurality of split washer portions in the seat means in the aperture around the heating element lead portion, and a hollow elongated connector sleeve rigidly fixed to the sprue bushing with one end received in the aperture adjacent the second split washer means, with the heating element lead portion extending therein for connection to external lead wires.

Further objects and advantages of the invention will appear from the following description taken together with the accompanying drawings.

BRIEF DESCRIPTION OF THE DRAWINGS

FIG. 4 is another sectional view showing the preferred embodiment; and

FIG. 5 is a partial isometric view showing the completed sprue bushing connected to external lead wires.

DESCRIPTION OF THE PREFERRED EMBODIMENTS

Figure 1:
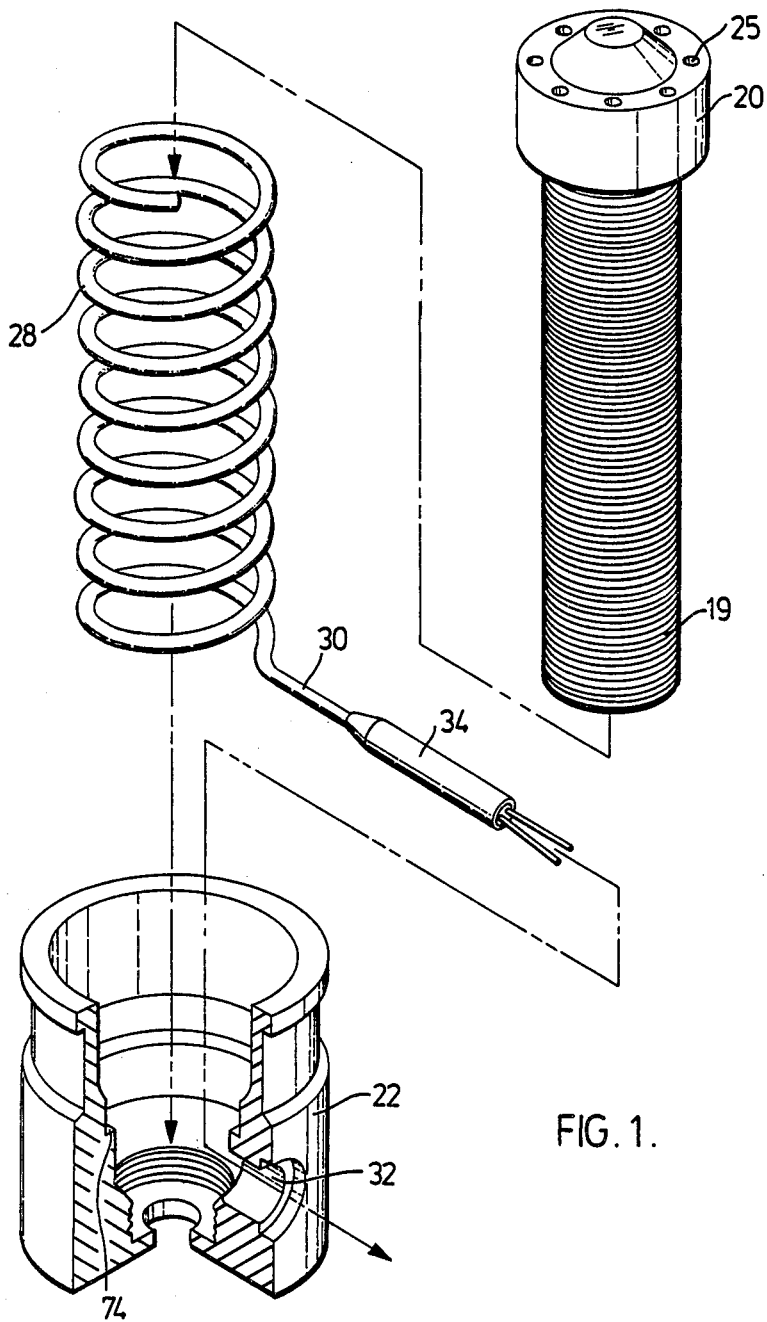
FIG. 1 is an exploded isometric view of a portion of a sprue bushing according to a preferred embodiment of the invention.

Referring to the drawings, the sprue bushing 10 according to a preferred embodiment of the invention, has a hollow elongated inner core portion 12, a highly conductive portion 14, an outer sleeve portion 16 and a connector assembly 18. The inner core portion 12 has an enlarged front portion 20 and an enlarged back collar portion 22, with a central runner passage 24 extending centrally therethrough. An electrical heating element 26 has a helical portion 28 which encircles the inner core portion 12 and a lead portion 30 which extends out through an aperture 32 in the back collar portion 22 and has an enlarged end portion 34. The connector assembly has two split washers 36,38 and a connector sleeve 39 which are seated in the aperture 32 in the back collar portion 22.

The back collar portion 22 of the inner core portion 12 has a seat 40 for receiving the nozzle of the molding machine (not shown) and the enlarged front portion 20 receives a nozzle seal 42. The nozzle seal 42 is formed of a titanium alloy and is described in detail in the applicant's U.S. Pat. No. 4,043,740 entitled "Injection Molding Nozzle Seal" which issued Sept. 2, 1977. The highly conductive portion 14 extends through a number of channels 25 arranged around the front portion 20 of the inner core portion 12. The electrical heating element 26 is of the two-core type with a metal sheath 44 formed of Inconel or stainless steel and a nickel chromium alloy resistance wire 46 enclosed in a refractory powder electrical insulating material 48 such as compacted magnesium oxide powder. The back collar portion 22 of the inner core portion 12 has a shoulder 50 which forms a seat 52 around the circular aperture 32. The split washers 36,38 are received in the seat 52 and each have a central opening 54,56 through which the lead portion 30 of the heating element 26 extends. The split washers 36,38 are each formed of a pair of half washers 58,60 and 62,64 and they are oriented so that the divisions therebetween are not in alignment. The connector sleeve 39 is hollow and has a flared portion 66 which extends to one end 68 which is received in the aperture 32 against the washers 36,38.

The sprue bushing 10 is assembled as described in detail below to form an integral unit. The inner core portion 12 is formed of a highly corrosion resistant material to withstand the effects of the melt flowing through it and the outer sleeve portion 16 is formed of a durable material to withstand the effects of corrosive gases from the gate area. In this embodiment, both of them as well as the connector sleeve 39 are formed of stainless steel. The portion 14 between the inner core portion 12 and the protective outer sleeve portion 16 is highly conductive to efficiently transfer heat from the heating element 26 and in this embodiment is a beryllium copper alloy.

Figure 2:
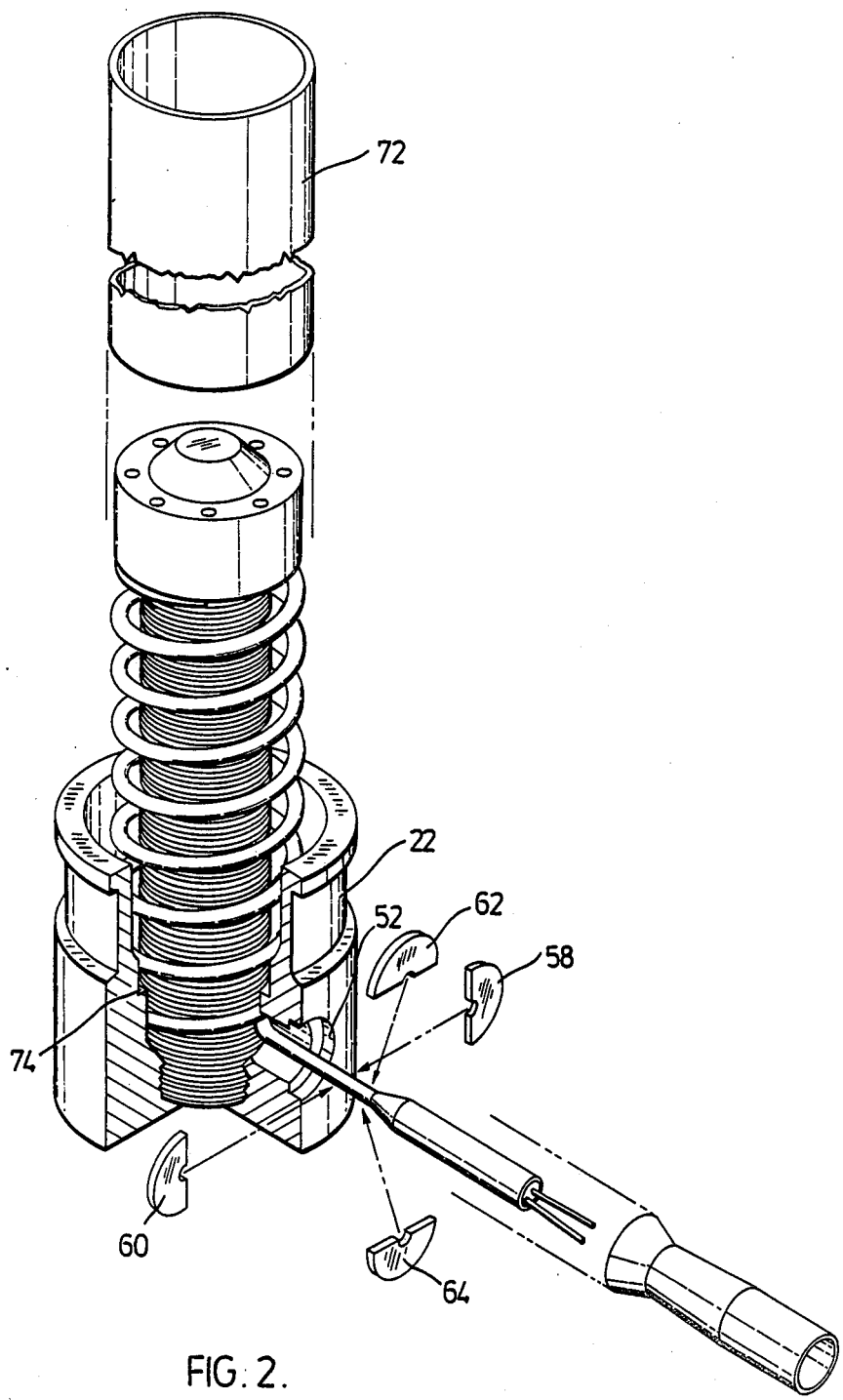
FIG. 2 is a further view showing the sprue bushing seen in FIG. 1 with a connector assembly.

Referring to the drawings in sequence, the sprue bushing is assembled by first screwing the enlarged front portion 20 onto the threaded main portion 19 of the inner core portion 12. The lead portion 30 of the heating element is then inserted through the aperture 32 in the back collar portion and the main portion 19 of the inner core portion 12 is inserted through the helical portion 28 of the heating element 26 and screwed into the back collar portion 22. In view of the configuration of the heating element 26 and it having an enlarged end portion 34, it is apparent that the aperture 32 must be considerably larger in diameter than the lead portion 30 of the heating element 26 in order to do this. The two pairs of half washers 58,60 and 62,64 are then fitted into the seat 52 around the lead portion 30 of the heating element 26 with the divisions between them being oriented at approximately 90° to each other. The connector sleeve 39 is then inserted over the protruding end portion 34 of the heating element and the end 68 of the connector sleeve 39 with the flared portion 66 is received in the aperture 32 against the outer washer 38. In order to temporarily secure the split washers 36,38 and the connector sleeve 39 in place, the back collar portion 22 is then burred at 70 around the aperture 32. Then with the assembly in an upright position, as shown in FIG. 2, an outer sleeve 72 is inserted over the front portion 20 and seated against a flange 74 in the back collar portion 22 of the inner core portion 12. A nickel brazing paste is then applied to the end 68 of the connector sleeve as well as to the other assembly joints, and the assembly is then heated in a vacuum furnace (not shown). The temperature and heating time must be sufficient to melt the paste causing it to run around the joints and then braze them. In addition to sealing the assembly joints against leakage, this has been found to connect the connector sleeve 39 to the back collar portion 22 in a manner which provides an integral structure with sufficient strength to protect the lead portion 30 of the heating element 26.

After brazing, a slug or shot 76 of a predetermined amount of beryllium copper alloy is inserted into the mouth 78 of the outer sleeve and the assembly is again heated in a vacuum furnace in the upright position. This melts the beryllium copper alloy which flows down through the channels 25 around the front portion 20 to fill the space 80 between the inner core portion 12 and the outer sleeve 72. The temperature and heating time must be sufficient to melt the conductive beryllium copper alloy and fill the space 80, without weakening the previously brazed joints. As is previously known, filling under a partial vacuum provides an improved bond of the beryllium copper alloy to the helical portion 28 of the heating element 26 and the inner core portion 12. This, combined with the fact that the copper alloy is highly conductive provides for the efficient transfer of heat away from the coils of the heating element 26 and spreads it more evenly along the main portion 19 of the inner core portion 12. It will be appreciated that the brazing and filling steps are normally carried out in batches as described and illustrated in the applicant's above mentioned U.S. patent application Ser. No. 217,115.

Figure 3:
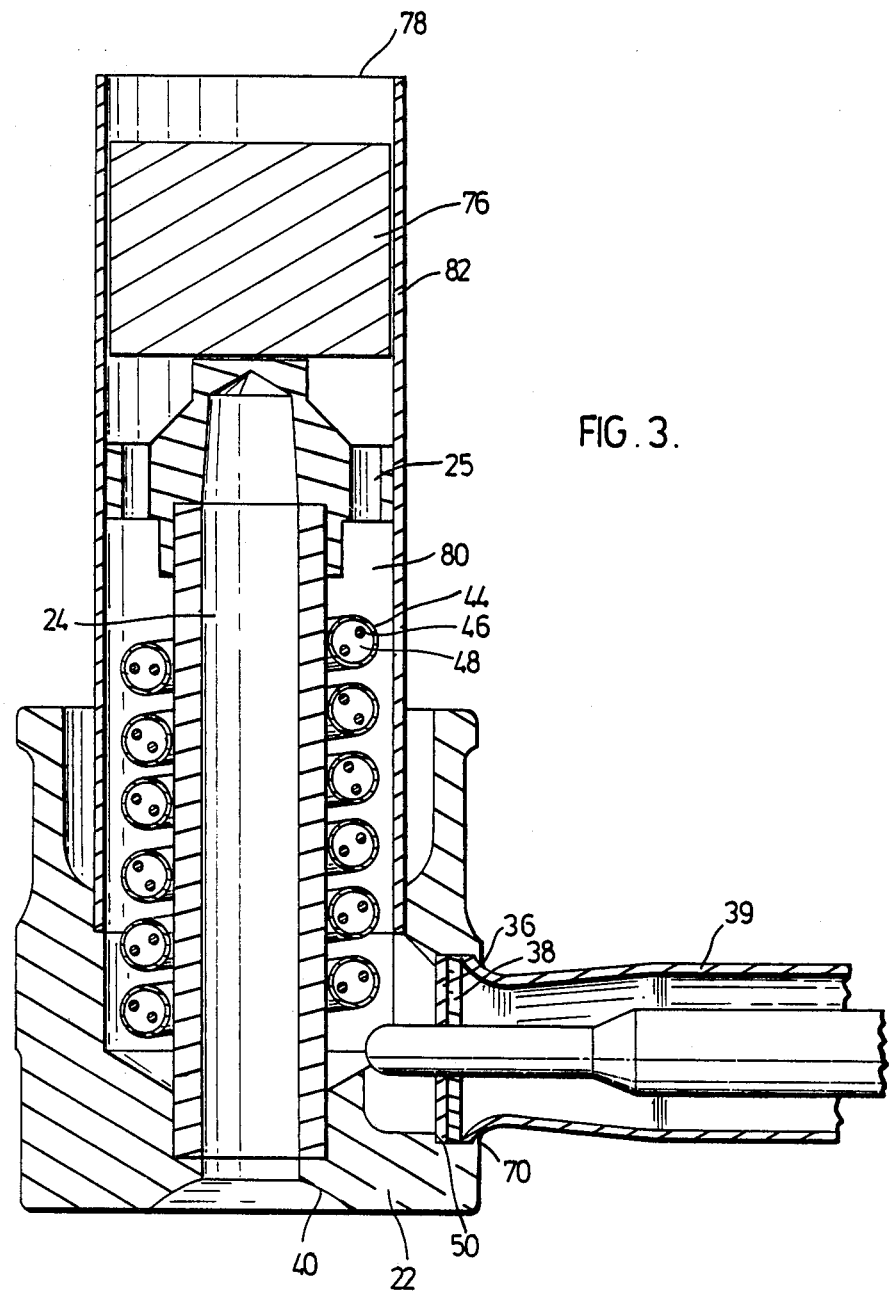
FIG. 3 is sectional view showing a further step in the assembly according to the preferred embodiment.

After filling, the sprue bushing is finished by machining to remove the projecting portion 82 of the outer sleeve 72 and to form the desired type of tip 84. As may be seen in FIG. 3, in the preferred embodiment a seat 86 is provided to the titanium alloy nozzle seal 42.

In use, the sprue bushing 10 is installed in a mold (not shown) to convey melt from a molding machine to a cavity. The melt is, of course, pressurized at high temperatures and the surrounding atmosphere may be considerably corrosive and therefore it is desirable to connect to the electrical heating element 26 with a shielded cable 88. As seen in FIG. 4, the heating element 26 is made with the resistance wires 46 extending from the magnesium oxide insulating material 48 in the enlarged end portion 34 of the heating element 26 and they are connected by crimping sleeves 90 to the external lead wires 92 from the cable 88. A Teflon (trade mark of Dupont for polytetrafluoroethylene) insulating tube 94 is located over each connection, and they are covered by a plastic shrink tube 96 to electrically insulate the wires. A silicone rubber filling 98 is then inserted up to the magnesium oxide 48 to provide additional insulation. Finally, a braided armour metal shield 100 from the cable 88 is pushed under the connector sleeve 39 which is then crimped, as shown in FIG. 5, to securely retain everything in position. In addition to providing a continuous metal outer protective coating for the wires, this structure provides an air space 102 in the connector sleeve 39, which in combination with the magnesium oxide in the heating element effectively protects the materials in the connection area against excessive temperatures. During operation, there is a considerable temperature gradient from the copper alloy which was retained by the seal formed by the washers 36,38, along to the area of the crimping sleeves 90. This provides a durable connection which will not be corroded by surrounding gases or burn out due to excessive heat from the heating element.

While the description of the sprue bushing with the improved connector assembly and the method of making it have been given with respect to preferred embodiments, it is not to be construed in a limiting sense. Variations and modifications may now occur to those skilled in the art. In particular, it is apparent that the structure of the sprue bushing will be different for different applications. Reference is made to the appended claims for a definition of the invention.

What I claim is:

1. In an integral electrically heated sprue bushing having a hollow elongated inner core portion with a runner passage extending centrally therethrough, an electrical heating element with a helical portion encircling the inner core portion and a lead portion having an enlarged end portion, the lead portion extending out through an aperture in the sprue bushing which is considerably larger than the heating element lead portion, a highly conductive elongated portion around the helical portion of the heating element, and an elongated outer sleeve portion over the conductive portion, the improvement further comprising:

(a) the aperture having seat means therein,
(b) first split washer means with a central opening through which the heating element lead portion extends formed by fitting a first plurality of split washer portions in the seat means in the aperture around the heating element lead portion thereby substantially closing the space therearound,
(c) second split washer means similar to the first split washer means formed adjacent thereto by fitting a second plurality of split washer portions in the seat means in the aperture around the heating element lead portion, and
(d) a hollow elongated connector sleeve rigidly fixed to the sprue bushing with one end received in the aperture adjacent the second split washer means, with the heating element lead portion extending therein for connection to external lead wires.

2. An improvement as claimed in claim 1 wherein the first and second split washer means and the connector sleeve are vacuum brazed in position to become integral parts of the sprue bushing.

3. An improvement as claimed in claim 2 wherein the first and second split washer means each comprise a pair of half washers with divisions therebetween, the washer means being oriented in abutting relationship with the divisions not in alignment.

4. An improvement as claimed in claim 3 wherein the connector sleeve has a flared portion extending to the said one end received in the aperture.

* * * * *